United States Patent [19]

Mills

[11] Patent Number: 5,074,043
[45] Date of Patent: Dec. 24, 1991

[54] SAFETY-CABLE JACKET REMOVER

[76] Inventor: Edward O. Mills, 4325 Lynn Burke Rd., Monrovia, Md. 21770

[21] Appl. No.: 617,709

[22] Filed: Nov. 26, 1990

[51] Int. Cl.$^5$ ............................................. B21F 13/00
[52] U.S. Cl. .............................. 30/91.002; 30/90.001; 81/9.4; 81/9.44
[58] Field of Search ...................... 30/90.1, 90.7, 91.2, 30/90.2; 81/9.4, 9.44

[56] References Cited

U.S. PATENT DOCUMENTS

| | | |
|---|---|---|
| 1,725,114 | 8/1929 | Van Gelderen . |
| 2,455,591 | 12/1948 | Lindsay . |
| 2,819,520 | 1/1958 | Eyles . |
| 2,984,905 | 3/1959 | Harmon . |
| 3,080,469 | 7/1960 | Benoit . |
| 3,336,666 | 8/1967 | Calkin . |
| 3,528,325 | 9/1970 | Kamimura et al. . |
| 3,620,104 | 11/1971 | Horrocks . |
| 3,659,483 | 5/1972 | Matthews ........................ 81/9.5 C |
| 3,688,404 | 9/1972 | Muller ................................. 30/91.2 |
| 3,769,705 | 11/1973 | Biddle ................................. 30/90.1 |
| 3,822,470 | 7/1974 | Hildebrand ......................... 30/90.1 |
| 3,840,987 | 10/1974 | Netta ................................... 30/90.1 |
| 3,878,606 | 4/1975 | Hug ..................................... 30/90.1 |
| 4,179,804 | 12/1979 | Maytham ............................ 30/90.1 |
| 4,426,778 | 1/1984 | Christie ............................... 30/90.1 |
| 4,441,400 | 4/1984 | Sexton . |
| 4,587,731 | 5/1986 | Krampe .............................. 30/90.1 |
| 4,640,009 | 2/1987 | Liversidge .......................... 30/90.1 |
| 4,689,882 | 9/1987 | Lorenz ................................ 30/90.1 |
| 4,736,501 | 4/1988 | Fujimoto ............................ 30/91.2 |
| 4,769,910 | 9/1988 | Noon .................................. 30/90.1 |
| 4,934,219 | 6/1990 | Edwards ............................. 81/9.44 |
| 4,953,428 | 9/1990 | Commes ............................. 81/9.4 |

Primary Examiner—Frank T. Yost
Assistant Examiner—Hwei-Siu Payer
Attorney, Agent, or Firm—Lowe, Price, LeBlanc & Becker

[57] ABSTRACT

An apparatus for removing a jacket from an underlying member such as a cable includes a tubular housing, a knife edge and a dial for positioning the blade. In an "open" position the blade is retracted from the housing to permit insertion of a cable into the housing. Rotation of the dial to a "CUT" position positions the blade on the cable, the blade substantially perpendicular to the cable, so that rotation of the remover circumferentially scores the cable jacket. Rotating the dial to a "strip" position angles the blade with respect to the cable so that rotation of the remover on the cable helically scores the cable jacket while the device tracks to the end and off the cable. The cable jacket is then removed by unwrapping the resultant helical strip of jacket from the cable end to the circumferential score line. The cable jacket remover is made of a plastic such as polyvinylchloride pipe to reduce a shock hazard and includes a scale for measuring the terminal length of cable to be stripped. A blade carrier restricts penetration of the knife edge into the cable jacket to avoid cutting through the cable jacket into underlying structure of the cable.

37 Claims, 3 Drawing Sheets

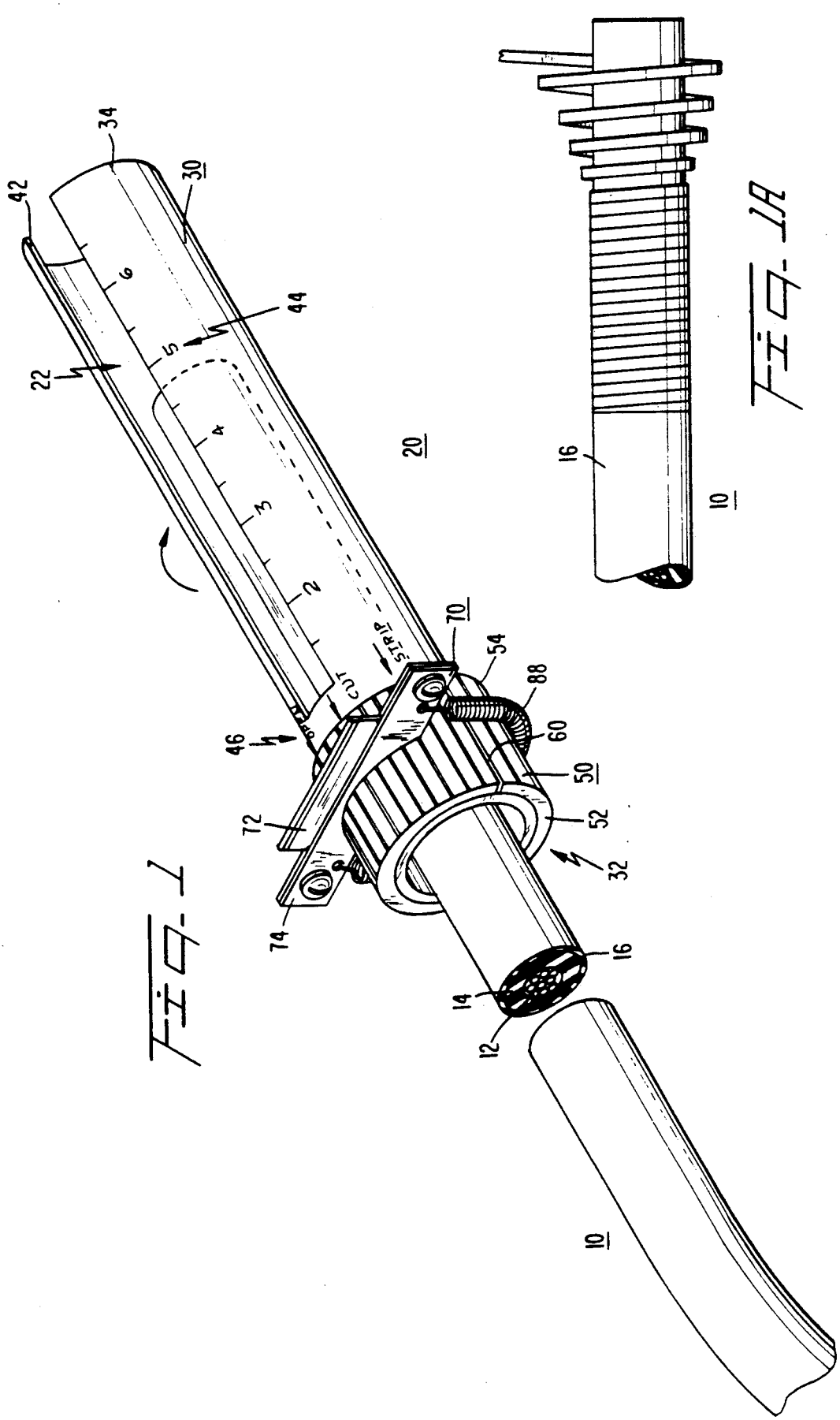

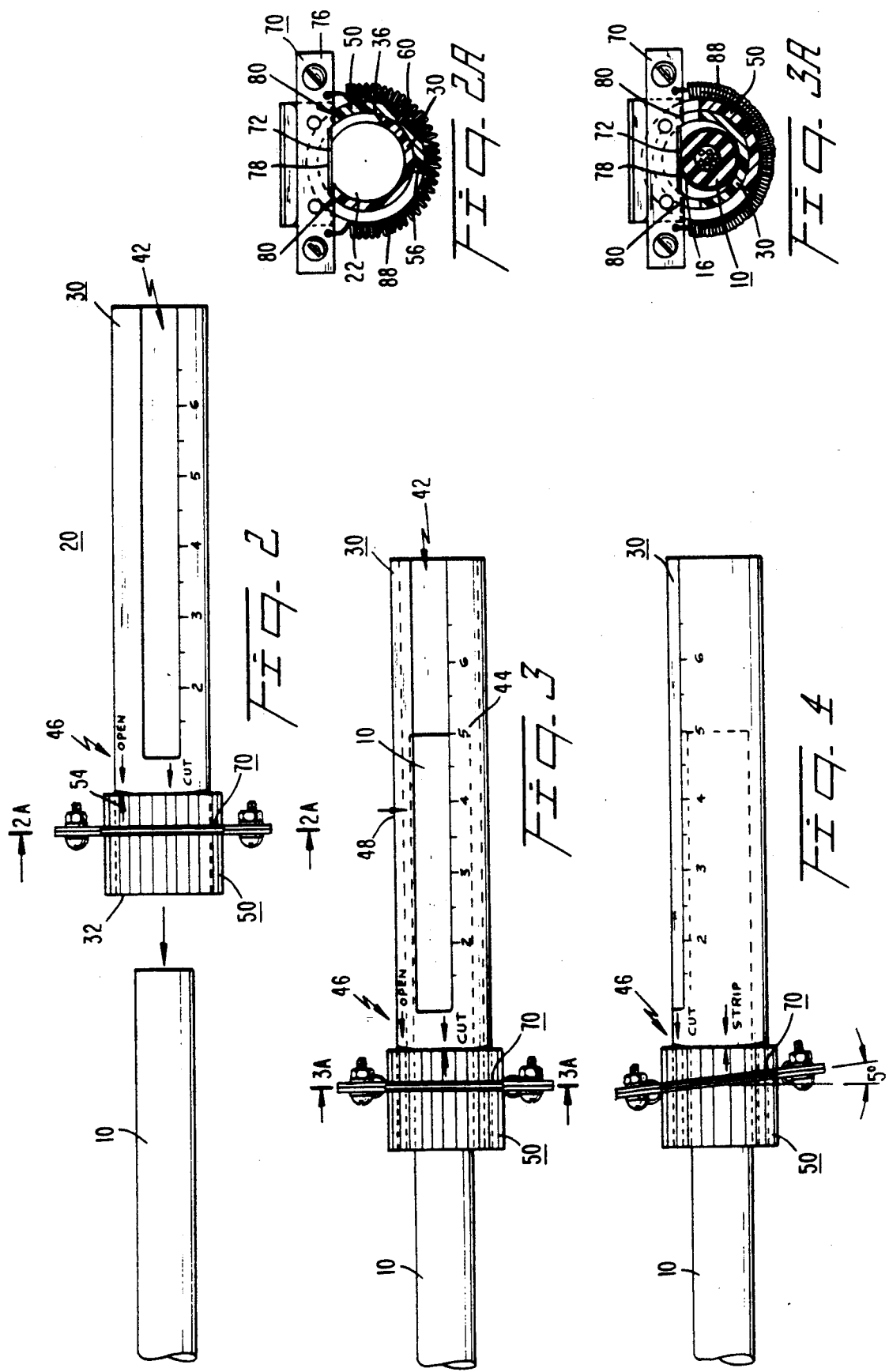

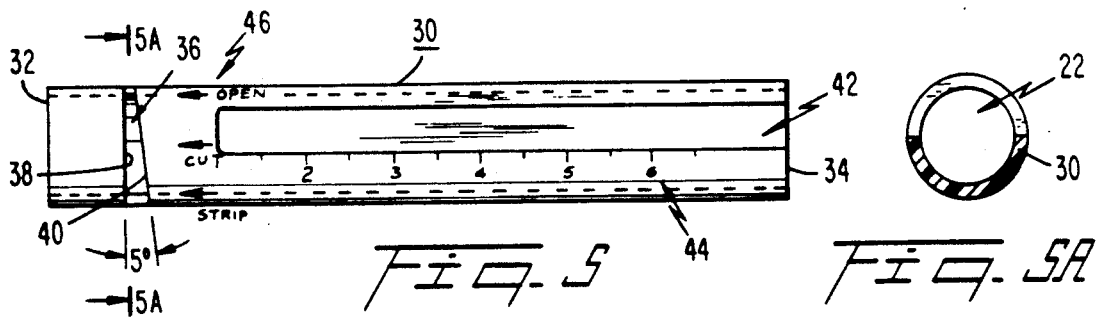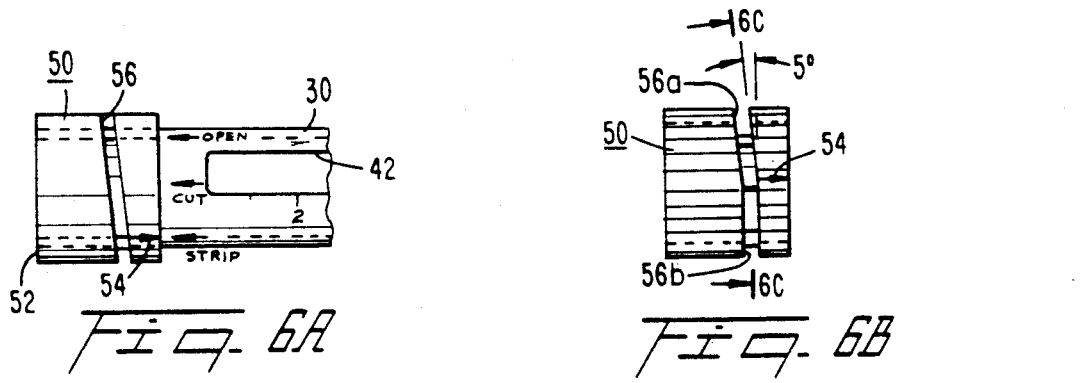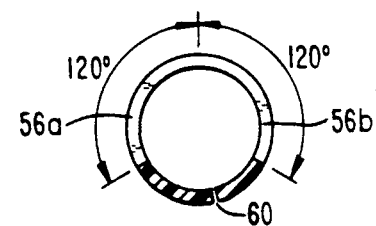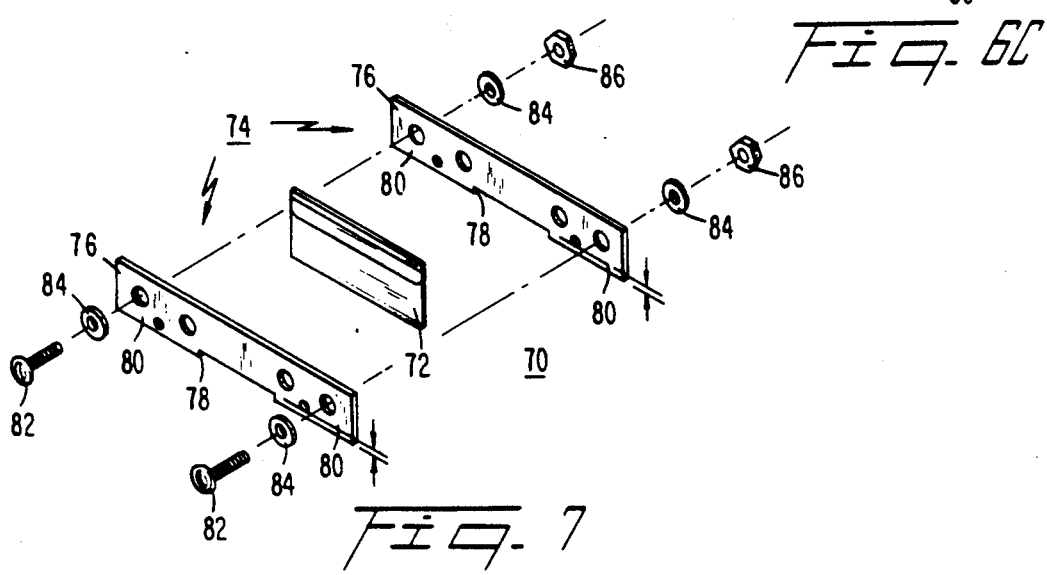

SAFETY-CABLE JACKET REMOVER

TECHNICAL FIELD

The invention relates to electric cables and particularly to devices for removing a plastic jacket from a primary service cable in electrical power transmission.

BACKGROUND ART

Electric power systems include equipment to generate, transmit and distribute electric energy to residential, industrial, commercial and rural users. Generating stations or power plants use fuel, water power, or nuclear reaction to produce alternating-current (AC) 3-phase, 60-cycle electric power. The output voltage from a typical electric generator is in the range of 11,000 to 20,000 volts. The output voltage from the generators is stepped up by transformers for transmission. Transmission systems supply electric power from the generating stations to load areas, typically using high transmission voltages in the range of 110,000 to 345,000 volts. The high transmission voltages are stepped down by bulk-power substations, providing power to distribution substations over subtransmission lines at levels of 23,000 to 69,000 volts.

The distribution substation provides power over primary distribution circuits operated at between 4160 and 25000 volts using primary feed cables. Primary feeders often use buried-cable installations at 7600 volts to provide electric power from the distribution substations to load areas. Conveniently located transformers step down the primary feed voltage for low-voltage distribution over secondary lines in the 115 to 230 voltage utilization range.

The primary distribution system using underground buried-cable installations have primary service cables which connect distribution substations to local distribution transformers. A typical residential primary service cable 10, shown in FIG. 1, having an outside diameter of approximately ⅞ inch, provides 7600 volt, 100–200 amperes service using AWG number 2 standard copper cable. Inner conductor 12 comprises seven strands of copper conductor having an outside diameter of 5/16 inch with a 7/32 inch thick inner insulation layer 14 surrounding inner conductor 12. A 1/32 inch thick semiconductor jacket 16 surrounds inner insulation layer 14 and bleeds off excess and static voltage from the surface of the primary service cable. A helical wound jacket of stranded copper conductor (not shown) surrounding semiconductor jacket 16 is used as a neutral in single and three phase systems.

Initial installation and subsequent repair of the feeders requires that primary service cables to be spliced together. For example, failure of a primary feeder may require a faulty section of cable to be removed and replaced. Direct buried cables must be excavated to gain access to the faulty section of cable for repairs. The faulty portion of cable is removed and a new section of cable is installed by splicing performed by a technician in the excavated ditch area.

To splice the primary cable, the helical wound strands of copper conductor surrounding the semiconductor jacket of each cable are removed. A hawk billed knife is then used to score the semiconductor layer to remove approximately 3½ inches of the plastic jacket from the ends of the cables to be spliced. It is preferable to score rather than cut through the plastic semiconductor layer to avoid nicking the relatively soft underlying insulation. Scoring of the inner insulation can seriously degrade the insulating properties of the cable and permit tracking of the high voltage to ground, i.e., conduction of current through contaminants contained in the score lines, causing the cable to short-circuit to ground.

After the plastic semiconductor layer is removed, a stripping tool is used to remove a one inch section of the inner insulation at the ends of the cables. A metallic press connector is used to connect the buried inner conductors of the cables being spliced. Silicone compound is applied to the buried conductors and a rubber sleeve is slid over the cables to protect the resultant splice. The rubber sleeve extends over the plastic semiconductor layer of the cables and protects against the introduction of contaminants from the surrounding ground soil. The helical wound strand of copper conductors are then reconnected using crimp connectors and the cable is reburied.

While using the conventional hawk bill knife to remove the plastic semiconductor jacket from the primary service cable, the technician must exercise extreme care to avoid allowing the knife blade to come in contact with live cables in the vicinity of the repair area posing an electric shock hazard. The technician must also exercise care in using the knife to avoid injury if the knife should slip during stripping of the jacket layer and must exercise care, as mentioned above, to avoid nicking the underlying insulation while attempting to only score the semiconductor jacket. Maintaining a honed edge on the knife is a further concern since a sharp score line is required to later peal back the semiconductor jacket and expose the underlying insulation layer. Maintaining the knife in a sharpened condition is difficult due to the non-optimal field environment working in a repair ditch. Further, the technician must take care to remove the required section of semiconductor jacket by measuring the section to be removed with a rule, carefully scoring the jacket only to the desired point. Poor lighting conditions can make the measurement difficult.

Accordingly, an object of the invention is to provide a safety-cable jacket remover which accurately scores a plastic cable jacket without nicking or otherwise damaging an underlying insulation layer or conductor.

Another object of the invention is to provide a safety-cable jacket remover made of non-conductive materials which minimize a shock hazard to the user of the device.

Still another object of the invention is to provide a safety-cable jacket remover which incorporates a measuring device for proper positioning to remove a desired length of jacket.

Another object of the invention is to provide a safety-cable jacket remover which does not have an exposed blade liable to cause injury.

A further object of the invention is to provide a safety-cable jacket remover having an inexpensive and easily replaceable blade which does not require sharpening.

A still further object of the invention is to provide a safety-cable jacket remover which selectively scores a plastic jacket (1) circumferentially and (ii) helically to permit easy removal of the jacket by unwinding of the helical portion up to the full circumferential score line.

Another object of the invention is to provide a safety-cable jacket remover with means to adjust the depth of penetration of a blade to accommodate scoring or removal of cable jackets of varying thickness.

A still further object of the invention is to provide a safety-cable jacket remover which accommodates a range of cable sizes without requiring calibration or adjustment.

DISCLOSURE OF THE INVENTION

According to one aspect of the invention, a device for removing a jacket from an underlying member includes a tubular housing, a blade and blade positioning means. The underlying member may be an electrical cable. The blade positioning means (a) laterally position the blade within the tubular housing, and (b) selectively positions the angle of the blade with respect to the housing. In a first position, a cutting edge of the blade is substantially perpendicular to a major access of the housing and, in a second position, is positioned at a predetermined acute angle with respect to the major axis of the tubular housing. The tubular housing is made of an electrical insulator such as polyvinylchloride pipe. The blade is secured in a carrier with a spring attached to the carrier for positioning the cutting edge of the blade in toward the housing. The carrier exposes a predetermined portion of the blade to limit penetration of the knife edge into a cable jacket. A scale is provided in the housing for measuring a terminal end length of cable inserted into the housing, a jacket portion of which is to be removed.

According to another aspect of the invention, the blade positioning means includes a blade carrier with the blade mounted in the carrier to expose a central portion of the cutting edge. A dial for positioning the blade carrier is provided on an outer tube which is rotatable on the tubular housing. The housing and the dial have respective slots therethrough wherein rotation of the dial on the housing adjusts a size and an orientation of an opening formed by the coincidence of the housing and the dial slots. The blade carrier is positioned in the opening whereby a penetration depth and an angle of the cutting edge with respect to the housing is adjustable by rotation of the dial on the tubular housing. The tubular housing and outer tube are electrical insulators, conventionally made of PVC pipe. End portions of the blade carrier have blunt edges which are supported by end walls of the housing and dial slots.

The housing slot is arcuate with a first side wall formed substantially perpendicular to the major access of the housing. A second side wall forms a first acute angle with the major axis of the housing. The slot in the dial has first and second linearly contiguous portions with substantially parallel side walls formed in the outer tube. The side walls of the first portion of the dial slot are formed substantially perpendicular to a major access of the outer tube, while the side walls of the second portion of the dial slot form a second acute angle with a major access of the outer tube. The first and second acute angles are within the range of 88° to 60° and preferably within the range of 87° to 82° with respect to the central axis of the housing. The first and second portions of the dial slide each circumferentially subtend an angle of at least 90° around the outer tube.

The above and other objects, features and advantages of the present invention will become apparent from the following description and the appended claims taken in conjunction with accompanying drawings.

BRIEF DESCRIPTION OF DRAWINGS

FIG. 1 is a perspective view of a cable jacket remover positioned on a primary service cable including a sectional view through the cable.

FIG. 1A is a side view of a primary surface cable with a jacket helically scored and partially unwrapped for removal.

FIG. 2 is a side view of a cable jacket remover being positioned over a primary service cable to remove the outer jacket thereof.

FIG. 2A is a transverse cross-sectional view of the cable jacket remover of FIG. 2 in the open position to allow insertion of a cable end.

FIG. 3 is a side view of a cable jacket remover positioned on a primary service cable with the blade in a cut position to circumferentially score the cable jacket.

FIG. 3A is a transverse cross-sectional view of the cable jacket remover of FIG. 3 showing the knife blade positioned for scoring the cable jacket.

FIG. 4 is a side view of a cable jacket remover positioned on a primary service cable with a knife blade in a strip position to helically score the cable jacket.

FIG. 5 is a side view of a cable jacket remover handle tube with a circumferential slot through which a knife blade engages a cable to be stripped.

FIG. 5A is a transverse cross-sectional view of the handle tube of FIG. 5 showing the angular extent of the circumferential slot in the handle tube.

FIG. 6A is a partial side view of the cable insertion end of the cable jacket remover with a blade positioning collar positioned on the handle tube.

FIG. 6B is a side view of a blade positioning collar showing angled and straight portions of a partial circumferential slot.

FIG. 6C is a transverse cross-sectional view of the blade positioning collar of FIG. 6B showing the lateral extent of the angled and straight portions of the partial circumferential slot.

FIG. 7 is an exploded perspective view of a blade assembly.

BEST MODE FOR CARRYING OUT THE INVENTION

Referring to FIG. 1, a cable jacket remover comprises three major assemblies including handle tube 30 and blade positioning collar 50 formed by concentric cylinders, and a blade assembly 70. The assembled cable jacket remover 20 is approximately 8 inches long with an inside diameter of 1 inch to accommodate cables 10 having outside diameters within the range of approximately ⅜ to ⅞ inch. Other tube sizes may be used to accommodate corresponding cable dimensions.

Handle tube 30 is a ⅛ inch length of polyvinylchloride (PVC) tubing having an inside diameter of 1 inch and an outside diameter of between 1¼ and 1 5/16 inches and a wall thickness of approximately 5/32 inch. Cable 10 can be inserted into cavity 22 through insertion end 32 of handle tube 30. Grip end 34 is used to manually rotate cable jacket remover 20 during jacket removal operations.

Cable measurement window slot 42 permits observation of the terminal end of cable in relation to cable insertion markings 44. The cable measurement window 42 is approximately ½ inch wide and extends 6 inches inward from grip end 34 of handle tube 30. Cable insertion markings 44 located along one edge of cable measurement window slot 42 indicate the distance from blade assembly 70 to the terminal end of cable 10 for gaging the length of jacket 16 to be stripped off from cable 10.

Collar position markings 46 are printed on, or scribed in, handle tube 30 for aligning blade positioning collar 50 in an "OPEN", "CUT", or "STRIP" position. Each of the collar positions places blade assembly 70 in a corresponding position. In the "OPEN" position, blade assembly 70 is raised to permit insertion of a cable into cavity 22. In the "CUT" position the blade assembly is positioned on cable 10 for straight circumferential scoring of jacket. In the "STRIP" position, the blade assembly is angled with respect to the cable to helically score the cable for easy removal.

Blade positioning collar 50 is made of PVC tubing having an inside diameter of approximately 1 5/16 inches. This dimension corresponds to the outer diameter of handle tube 30 to allow rotation of collar 50 thereon. Collar 50 has an outside diameter of 1⅝ inches and a series of parallel grooves to facilitate gripping and rotation of the collar to position blade assembly 70. Cable insertion end 52 of collar 50 is adjacent insertion end 32 of underlying handle tube 30. Opposite collar positioning reference mark end 54 is adjacent collar position markings 46 of handle tube 30. Longitudinal slot 60 facilitates rotation of collar 50 on handle tube 30. The natural resiliency of the PVC material of collar 50 provides a snug fit of the collar on the underlying tubing while accommodating slight irregularities in the shape of both the collar and tube.

Blade assembly 70 is positioned in slots formed through handle tube 30 and blade positioning collar 50 so that cutting edge 72 can be positioned to contact and score semiconductor jacket 16 of cable 10. Blade 72, conventionally a single edge razor blade, is mounted in blade carrier 74 which in turn is held in position by stainless steel tension spring 88. Referring to FIG. 7, blade 72 is securely clasped between brass plates 76 under compressive force supplied by bolts 82 and nuts 86 exerted through washers 84 at opposite ends of plates 76. Spring 88 is a conventional ¼ inch diameter, 2 inches long stainless steel tension spring which may include a plastic coating or sheath to minimize electric conduction through the spring and resultant shock hazard.

Referring to FIG. 5, handle tube 30 has a partial circumferential slot 36 with a side wall 38 nearest cable insertion end 32 substantially perpendicular to a central axis of handle tube 30. Opposite side wall 40 of slot 36 is angled approximately 5° with respect to side wall 38 thereby forming an angle of approximately 85° with respect to the central axis of handle tube 30. The angle of side wall 40 sets the blade angle used to helically score the cable jacket. For thick cables, a blade angle of 88° would produce closely spaced score lines to assist removal of the jacket. Conversely, thin, flexible jackets can be removed with less scoring wherein a blade angle of 60° can be used. For conventional primary cables, a blade angle of between 87° and 82° is optimal.

Side walls 38 and 40 of slot 36 terminate at a common top wall, with the side walls spaced ⅛ inch apart. The side walls terminate at a bottom wall which spaces the side walls ¼ inch apart. Partial circumferential slot 36 extends for approximately 180° around the circumference of handle tube 30. The ⅛ inch minimum spacing between side walls 38 and 40 is dictated by the ⅛ inch width of blade assembly 70 accommodated by slot 36, while the angular diversion of the side walls corresponds to the maximum scoring angle of the blade assembly when in the strip position.

FIG. 6A is a side view showing blade positioning collar 50 positioned on handle tube 30 and rotated to place the blade assembly in the strip position for helically scoring a cable jacket. Partial circumferential slot 56 of blade positioning collar 50 includes an angled portion 56 (FIG. 6B) and a straight portion. Angled portion 56A is positioned approximately 85° with respect to the central axis of collar 50. One end of angled portion 56A is 11/16 inch from cable insertion end 52; the slot slopes toward alignment marking end 54 to a point centered ⅞ inch from the cable insertion end. The angle of the angled portion of slot 56 is equal to the angle of slot side wall 40 of handle tube 30. Thus, angled portion 56A can be provided with an angle in the range of 88° to 60° as described with reference to side wall 40.

Straight portion 56B of partial circumferential slot 56 is positioned substantially perpendicular to the central axis of collar 50 with the center of the slot located approximately ⅛ inch from cable insertion end 52 of the collar.

The coincidence of slot 36 of handle tube 30 and slot 56 of blade positioning collar 50 forms an aperture of varying geometry extending into the cavity 22 of cable jacket remover 20. When collar positioning reference mark 54 is aligned opposite the "OPEN" collar position mark 46, the longitudinal extent of the aperture is minimized thereby limiting penetration of blade assembly 70 into central cavity 22 of cable jacket remover 20. Rotation of collar 50 on handle tube 30 into the "CUT" position exposes the full longitudinal extent of slot 36 of handle tube 30 through straight portion 56B of collar 50. This permits an increased depth of protrusion of blade assembly 70 into the cavity of cable jacket remover 20. The blade assembly is positioned substantially perpendicular to the central axis of the cable jacket remover in the "CUT" position. Further rotation of collar 50 on handle tube 30 aligns angled portion 56A of slot 56 within underlying slot 36 of handle tube 30. With slots 36 and 56A aligned, blade assembly 70 is positioned at an acute angle of approximately 85° with respect to the central axis of the cable jacket remover.

Blade assembly 70 includes a blade 72 which may be a conventional single edge razor blade. Knife edge 72 is mounted in blade carrier 74 to limit the penetration depth of a cutting edge of blade 72 into cable jacket 16 and to provide blunt tab regions at the longitudinal ends of the blade which engage corresponding upper and lower walls of slots 36 and 56 for positioning the blade. Blade carrier 74 includes a pair of brass plates, each 1/6 inch thick by ½ inch high by 2 inches long. Brass plates 76 include a central recess portion 78 approximately 15/16 inch wide and 1/32 inch deep to expose a corresponding portion of knife edge 72. The width of central recess portions 78 is equal to or less than the minimum aperture formed by the coincidence of slots 36 and 56 when collar 50 is in the "OPEN" position. Limiting the exposed cutting edge to the minimum aperture size avoids the possibility of the cutting edge of blade 72 gouging into the walls of tube 30 or collar 50. Blunt end portions 80 of blades 76 contact and ride on end portions of slot 36 and 56 to position blade assembly 70 by appropriate rotation of collar 50.

Operation of the safety-cable jacket remover is described with reference to FIGS. 2-4. Cable jacket remover 20 is placed in the "OPEN" position by rotating blade positioning collar 50 to align mark 58 with the appropriate collar position marking as shown in FIG. 2. Referring to FIG. 2A, when in the "OPEN" position, the aperture formed by the coincidence of slots 36 and 56 is minimized. Blunt end portions 80 of blade assembly 70 are forced radially outward from central cavity 22 permitting insertion of cable 10 into cable jacket remover 20.

Referring to FIG. 3, the terminal end of cable 10 is aligned with the cable insertion marking corresponding to the desired length of jacket to be scored and removed. Collar 50 is then rotated to the "CUT" position, effectively increasing the size of the resultant aperture and lowering blade assembly 70 into cavity 22 under the influence of spring 88. In the "CUT" position, blade assembly 70 is positioned substantially perpendicular to the central axis of tube 30. Penetration of blade 72 into cable 10 is limited to the portion of the blade exposed at central recess portion 78. Brass plate 76 on opposite lateral sides of the knife edge prevent the blade penetrating completely through jacket 16 and scoring underlying insulation layer 14.

After placing the cable jacket remover in the "CUT" position, handle tube 30 is rotated one complete revolution in the direction of arrow 48 to score a circumferential line about jacket 16. This initial score line defines the extent of the portion of the jacket to be removed. Collar 50 is then rotated to the "STRIP" position, positioning blade assembly 70 approximately 5° with respect to the original circumferential scored line. Handle tube 30 is again rotated in the direction of arrow 48 so that a spiral band is scored along the length of cable jacket 16 to the end of the jacket. As cable jacket remover 20 is rotated, it gradually moves off the cable, tracking along the spiral score line formed by blade assembly 70. When cable jacket remover 20 has tracked off the length of cable 10, jacket 16 can be removed by unwinding of the jacket in a direction opposite the spiral, unwinding from the end of the cable toward the initial circumferential cut as shown in FIG. 1A.

The cable jacket remover described is particularly useful in the rugged field environment. The simple construction accommodates easy disassembly, cleaning and reassembly without special tools. Use of PVC tubing minimizes shock hazards and results in a light weight device. The device performs the functions previously requiring a hawk billed knife and ruler, while insuring accurate and consistent jacket removal. Unlike the separate tools which it replaces, the cable jacket remover does not require a skilled operator to prepare a cable to be spliced and minimizes the risk of damaging the cable insulation caused by cutting into the insulation when using a hawk billed knife.

Although a preferred embodiment of the invention has been described herein, other variations within the scope of the invention are possible. For example, dimensions of the cable jacket remover may be varied to accommodate various sized cables. The invention is equally applicable to removal of jacketing from sheathed members in general including vinyl clad structural members and other types of cables including coaxial cables and multiconductor cables having a substantially uniformed curved outer jacket. The materials used to construct a cable jacket remover according to the invention can be metallic where prevention of a shock hazard is not a concern or can be made of insulating materials other than PVC piping. Vinyl coated metallic construction is also possible to avoid creating a shock hazard. Remaining metallic portions of the apparatus may be covered with insulating material including a vinyl coating, to further minimize a shock hazard. Further, although a cable measurement window slot is shown in the preferred embodiment of the invention, utilization of a clear tubing or incorporating a clear window into opaque tubing would avoid the need to provide a viewing aperture.

Although the present invention has been described and illustrated in detailed, it is clearly understood that the same is by way of illustration and example only and is not to be taken by way of limitation, the spirit and scope of the present invention being limited only by terms of the appended claims.

What is claimed:

1. An apparatus for removing a jacket from an underlying member, comprising:
   a tubular housing;
   a blade having a cutting edge; and
   blade positioning means for (i) laterally positioning said blade within said tubular housing and (ii) selectively positioning said blade (a) with said cutting edge substantially perpendicular to a longitudinal axis of said housing and (b) with said cutting edge at a predetermined acute angle with respect to said longitudinal axis of said tubular housing,
   wherein said cutting edge of said blade is positioned substantially normal to a first axis, said first axis passing through, and normal to, said longitudinal axis of said housing, and said positioning means selectively positions said cutting edge of said blade by rotating said cutting edge about a second axis which passes through and is normal to said longitudinal axis of said housing, said first and second axes lying in a common plane.

2. The apparatus of claim 1, wherein said tubular housing is an electrical insulator.

3. The apparatus of claim 1, wherein said tubular housing comprises polyvinylchloride (pvc) pipe.

4. The apparatus of claim 1, wherein said housing includes means for measuring a terminal end length of cable inserted into said housing a jacket portion of which is to be removed.

5. The apparatus of claim 1, further including restricting means for limiting a penetration distance of said blade into said tubular housing.

6. The apparatus of claim 1, further comprising biasing means for resiliently positioning said blade with said cutting edge in said housing toward said longitudinal axis of said housing.

7. The apparatus of claim 6, wherein said blade is secured in a carrier and said biasing means comprises a spring attached to said carrier for resiliently positioning said blade with said cutting edge in said housing toward said longitudinal axis of said housing.

8. The apparatus of claim 1, further comprising blade depth adjustment means for limiting penetration of said cutting edge of said blade into a cable jacket.

9. The apparatus of claim 1, wherein said first and second axes are coaxial.

10. An apparatus for removing a jacket from an underlying member, comprising:
    a tubular housing;
    a blade having a cutting edge;
    blade positioning means for (i) laterally positioning said blade within said tubular housing and (ii) selectively positioning aid blade (a) with said cutting edge substantially perpendicular to a longitudinal axis of said housing and (b) with said cutting edge at a predetermined acute angle with respect to said longitudinal axis of said tubular housing; and
    blade depth adjustment means for limiting penetration of said cutting edge of said blade into a cable jacket including a blade carrier having a blunt edge, said blade mounted in said blade carrier, a predetermined portion of said blade protruding beyond said blunt edge of said blade carrier whereby penetration of said cutting edge of said blade into said cable jacket is limited by said blade carrier blunt edge.

11. An apparatus for removing a jacket from an underlying member, comprising:
a tubular housing;
a blade having a cutting edge;
blade positioning means for (i) laterally positioning said blade within said tubular housing and (ii) selectively positioning said blade (a) with said cutting edge substantially perpendicular to a longitudinal axis of said housing and (b) with said cutting edge at a predetermined acute angle with respect to said longitudinal axis of said tubular housing; and
restricting means for limiting a penetration distance of said blade into said tubular housing, including a blade carrier, said blade mounted in said blade carrier to expose a portion of said cutting edge in a central portion of said blade carrier, end portions of said blade carrier on opposite sides of said central portion of said blade carrier having blunt edges in contact with said housing to limit penetration of said blade carrier into said housing.

12. An apparatus for removing a jacket from an underlying member, comprising:
a tubular housing;
a blade having a cutting edge; and
blade positioning means for (i) laterally positioning said blade within said tubular housing and (ii) selectively positioning said blade (a) with said cutting edge substantially perpendicular to a longitudinal axis of said housing and (b) with said cutting edge at a predetermined acute angle with respect to said longitudinal axis of said tubular housing, said blade positioning means including
(i) a blade carrier, said blade mounted in said blade carrier to expose a portion of said cutting edge in a central portion of said blade carrier, and
(ii) a dial including an outer tube rotatable on said tubular housing, said housing and said dial having respective slots therethrough, rotation of said dial on said housing adjusting a size and an orientation of an opening formed by the coincidence of said housing and dial slots, said blade carrier positioned in said opening whereby a penetration depth and an angle of said cutting edge with respect to said housing is adjustable by rotation of said dial on said tubular housing.

13. The apparatus of claim 12, wherein said tubular housing and said outer tube are electrical insulators.

14. The apparatus of claim 12, wherein said tubular housing and said outer tube are made of polyvinylchloride (pvc) pipe.

15. The apparatus of claim 12, wherein said blade carrier has end portions on opposite sides of said central portion of said blade carrier, said end portions having blunt edges supported by end walls of said housing and dial slots.

16. The apparatus of claim 12, wherein said housing slot is arcuate, having a first side wall formed in said housing substantially perpendicular to said longitudinal axis of said housing and a second side wall formed in said housing forming a first acute angle with said longitudinal axis of said housing, said dial slot having first and second linearly contiguous portions with substantially parallel side walls formed in said outer tube, said side walls of said first portion formed substantially perpendicular to a longitudinal axis of said outer tube and said side walls of said second portion forming a second acute angle with said longitudinal axis of said outer tube.

17. The apparatus of claim 16, wherein said first and second acute angles are within the range of eighty-eight to sixty degrees.

18. The apparatus of claim 16, wherein said first and second acute angles are within the range of eighty-seven to eighty-two degrees.

19. The apparatus of claim 16, wherein said first and second portions of said dial slot each circumferentially subtend an angle of at least ninety degrees around the outer tube.

20. An apparatus for removing a jacket from an underlying member, comprising:
a blade having a cutting edge;
a blade holder for mounting said blade therein;
a tubular housing having a central void for receiving a cable therethrough and a partial circumferential slot for receiving said blade and said blade holder;
a spring for biasing said knife edge and said blade holder in said housing slot; and
adjustment means for controlling a position of said cutting edge in said circumferential slot, a penetration depth of said cutting edge radially into said housing, and an angular orientation of said cutting edge relative to a longitudinal axis of said housing.

21. The apparatus of claim 20, wherein said blade is secured in said blade holder, said spring attached to said blade holder for resiliently positioning said cutting edge in said housing toward said longitudinal axis of said housing.

22. The apparatus of claim 20, wherein said housing includes means for measuring a terminal end length of cable inserted into said housing a jacket portion of which is to be removed.

23. The apparatus of claim 20 further including restricting means for limiting a penetration distance of said blade cutting edge into said tubular housing.

24. The apparatus of claim 23, wherein said restricting means comprises said blade holder, said blade mounted in said blade holder to expose a portion of said cutting edge in a central portion of said blade holder, end portions of said blade holder on opposite sides of said central portion of said blade holder, said end portions having blunt edges in contact with said housing to limit penetration of said blade holder into said housing.

25. The apparatus of claim 20, wherein said adjustment means includes an outer tube rotatable on said tubular housing and having a partial circumferential slot therethrough, said blade and said blade holder positioned through said outer tube slot extending into said tubular housing slot under bias of said spring whereby rotation of said outer tube on said tubular housing varies a geometry of a resultant opening thereby positioning said cutting edge within said tubular housing.

26. The apparatus of claim 25, wherein said tubular housing and said outer tube are electrical insulators.

27. The apparatus of claim 25, wherein said tubular housing and said outer tube are made of polyvinylchloride (pvc) pipe.

28. The apparatus of claim 20, further comprising blade depth adjustment means for limiting penetration of said blade cutting edge into a cable jacket.

29. The apparatus of claim 28, wherein said blade depth adjustment means comprises said blade holder having a blunt edge, said blade mounted in said blade holder, a predetermined portion of said blade cutting edge protruding beyond said blade holder blunt edge whereby penetration of said blade cutting edge into said cable jacket is limited by said blade holder blunt edge.

30. The apparatus of claim 20, wherein said adjustment means comprises:
 a blade holder, said blade mounted in said blade holder to expose a portion of said blade cutting edge in a central portion of said blade holder; and
 a dial including an outer tube rotatable on said tubular housing, said housing and said dial having respective slots therethrough, rotation of said dial on said housing adjusting a size and an orientation of an opening formed by the coincidence of said housing and dial slots, said blade holder positioned in said opening whereby a penetration depth and an angle of said blade cutting edge with respect to said housing is adjustable by rotation of said dial.

31. The apparatus of claim 30, wherein said blade holder has end portions on opposite sides of said central portion of said blade holder, said end portions having blunt edges supported by end walls of said housing and dial slots.

32. The cable jacket remover of claim 30, wherein said housing slot is arcuate, having a first side wall formed in said housing substantially perpendicular to said longitudinal axis of said housing and a second side wall formed in said housing forming a first acute angle with said longitudinal axis of said housing, said dial slot having first and second linearly contiguous portions with substantially parallel side walls formed in said outer tube, said side walls of said first portion formed substantially perpendicular to a longitudinal axis of said outer tube and said side walls of said second portion forming a second acute angle with said longitudinal axis of said outer tube.

33. The jacket remover of claim 32, wherein said first and second acute angles are within the range of eighty-eight to sixty degrees.

34. The jacket remover of claim 32, wherein said first and second acute angles are within the range of eighty-seven to eighty-two degrees.

35. The jacket remover of claim 32, wherein said first and second portions of said dial slot each circufmerentially subtend an angle of at least ninety degrees around outer tube.

36. An apparatus for removing a jacket from an underlying member comprising:
 a blade having a cutting edge;
 a tubular main housing made of a nonconductive material and having an arcuate partially circumferential opening therethrough, said main housing having a central cavity for accepting a cable;
 a tubular outer housing rotatable on said main housing and having a circumferential slot therethrough, said slot having a first portion substantially perpendicular to a longitudinal axis of said outer housing and a second portion subtending an acute angle with said longitudinal axis of said outer housing, said slot aligned with said main housing cavity for positioning said knife blade in said main housing cavity;
 a tension spring for biasing said blade in an opening formed by a coincidence of main housing cavity and outer housing slot.

37. The jacket remover of claim 36, further comprising a blade holder having said blade mounted therein, said cutting edge of said blade exposed in a central portion of said blade holder, end portions of said blade holder on opposite sides of said central portion having blunt edges supported by end walls of said main housing cavity and outer housing slot.

* * * * *

UNITED STATES PATENT AND TRADEMARK OFFICE
CERTIFICATE OF CORRECTION

PATENT NO. : 5,074,043
DATED : December 24, 1991
INVENTOR(S) : Edward O. MILLS

It is certified that error appears in the above-identified patent and that said Letters Patent is hereby corrected as shown below:

```
Column 1, line 53, delete "to".
Column 3, lines 15, 51 and 54, change "access" to --axis--.
Column 4, line 49, change "a 1/8" to --an 8--.
Column 8, line 4, change "detailed" to --detail--;
          line 61, change "aid" to --said--.
Column 10, line 15, change "the" to --said--.
Column 12, line 11, after "around" insert --said--.
```

Signed and Sealed this

Thirteenth Day of April, 1993

Attest:

STEPHEN G. KUNIN

*Attesting Officer*      Acting Commissioner of Patents and Trademarks